April 30, 1963   L. F. NICHOLSON ET AL   3,087,693
AIRFIELD GROUND EQUIPMENT FOR VERTICAL TAKE-OFF AIRCRAFT
Filed Nov. 12, 1959   2 Sheets-Sheet 1

Inventors
LEWIS FREDERICK NICHOLSON &
LAWRENCE ALFRED WYATT By

Attorney

April 30, 1963  L. F. NICHOLSON ET AL  3,087,693
AIRFIELD GROUND EQUIPMENT FOR VERTICAL TAKE-OFF AIRCRAFT
Filed Nov. 12, 1959  2 Sheets-Sheet 2

LEWIS FREDERICK NICHOLSON &
LAWRENCE ALFRED WYATT

*Inventors*

By

*Attorney*

United States Patent Office 3,087,693
Patented Apr. 30, 1963

1

3,087,693
AIRFIELD GROUND EQUIPMENT FOR
VERTICAL TAKE-OFF AIRCRAFT
Lewis Frederick Nicholson, Farnborough, and Lawrence
Alfred Wyatt, Bedford, England, assignors to Power
Jets (Research and Development) Limited, London,
England, a British company
Filed Nov. 12, 1959, Ser. No. 852,308
Claims priority, application Great Britain Nov. 21, 1958
7 Claims. (Cl. 244—114)

The invention relates to airfield ground equipment of particular value to fixed wing vertical take-off and landing aircraft of the type in which vertical thrust is provided by a downwardly directed propulsive jet generated by what may be termed a "lifting" engine mounted in the aircraft.

When such aircraft are on or close to the ground, as is the case during take-off and landing, it has been found that the radially outward flow of the jet efflux after it impinges on the ground gives rise to a circulating flow beneath the aircraft wing which is composed of air entrained towards the jet by turbulent mixing and which exerts a downwardly acting suction on the wing. This suction may reduce the lifting effect of the jet by as much as 20% and is, of course, most severe during take off or landing when the aircraft is closest to the ground.

It will be obvious that this reduction is a serious disadvantage as, among other things, a large safety margin of vertical thrust over what is required to sustain the aircraft in flight, or in the absence of the suction effect, must be provided.

It is an object of the present invention to provide means for reducing the said suction effect.

Accordingly to the invention, airfield ground equipment for use by vertical take-off and landing aircraft of the aforementioned type comprises means for influencing the flow of propulsive jet over the ground in the form of a system of open channels for receiving and controlling the direction of flow of the jet to maintain at a low level entrainment by the jet efflux of air beneath the aircraft.

Preferably the channels are arranged to reduce to a minimum the radial horizontal spread of the jet efflux and are advantageously arranged so as to constrain the jet efflux to flow substantially along and parallel to one horizontal axis, to which end they may consist of a series of contiguous parallel sided channels.

One form of this latter arrangement consists in making the walls of the channels in two effective heights, alternate walls being high and low. A modification of this arrangement consists in slotting longitudinally the bases of the higher walls.

It is the case that shallow channels are least effective in maintaining the suction at a low value and that an optimum height and aircraft lifting jet combination may be found by experiment or calculation.

For one particular aircraft having a single jet it was found that using a system of channels of fixed height then for the suction to be a minimum the channel width $w$ and the radius $r$ of the jet should have the approximate relationship $$\frac{w}{r} = 1.5$$

and be preferably less than this value.

Too small a channel height brought about a critical suction value, the suction increasing rapidly when $$\frac{w}{r}$$

was reduced below 1.5. It was found that the height $h$

2 of the channels and jet radius $r$ should have the relationship $$\frac{h}{r} \geq 1.5$$

Thus the relationship of channel dimensions to jet radius in this particular case may be expressed as:

$$\frac{h}{r} \geq 1.5, \frac{w}{r} \not> 1.5$$

The actual dimensions of a channel system found satisfactory in practice bore the relationship $$\frac{h}{r} = 1.6 \text{ and } \frac{w}{r} = 0.683$$

It will be appreciated by those skilled in the art that the dimensions of the channels must be adequate to deal with the case in which an asymmetric suction causing rolling or pitching moments of the aircraft arises as a result of, for example, the aircraft wing or wings being other than parallel with the ground during take-off or landing. In the particular case described above it has been found that channels of optimum size to reduce suction to the desired minimum values in the symmetrical case are adequate for the asymmetrical case.

Four examples of the invention will now be briefly described with reference to the accompanying drawings in which.

Figure 1:
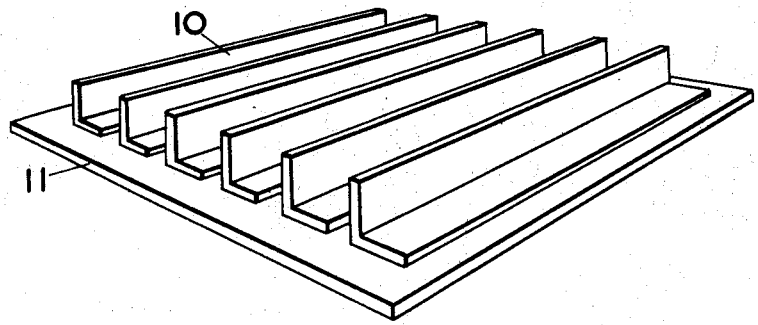
FIGURE 1 illustrates a method of constructing one system of channels.

The channel system shown in FIGURE 1 consists of a series of parallel "L" section members 10, mounted on a base plate II.

Figure 2:
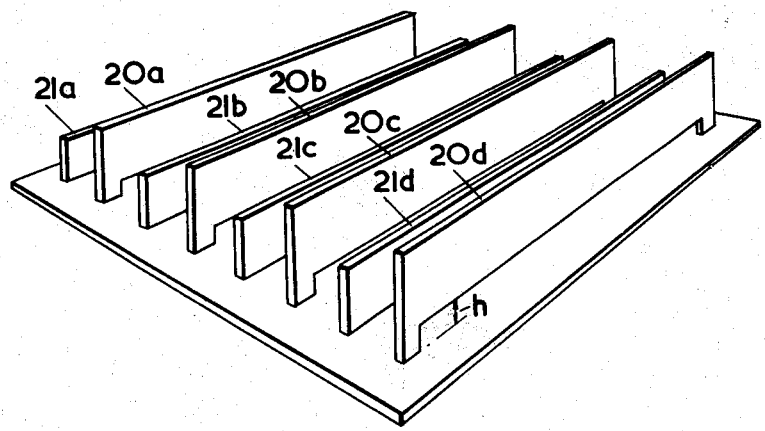
FIGURE 2 illustrates a system of which the channel walls have two heights.

FIGURE 2 shows in cross section part of a system of which the channel walls 20a, b, c, d etc. are higher than the walls 21a, b, c, d etc. and have a slot at the base of height $h$ equal to 15% of the height of the top of walls 20a, b, etc.

Figure 3:
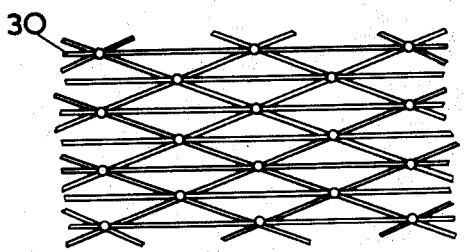
FIGURE 3 illustrates a type of open-mesh grid covering for the channels.

In FIGURE 3 the open-mesh covering 30 is a load bearing grid which may be laid on top of the channels to permit an aircraft to make use of the invention without risk of damage to the landing gear.

Figure 4:
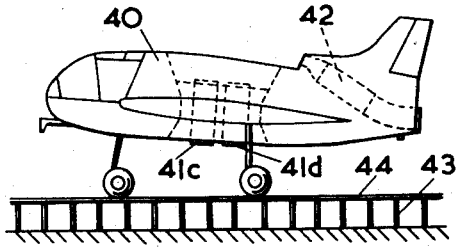
FIGURES 4 and 5 illustrate an aircraft in position on a channel system.
Figure 5:
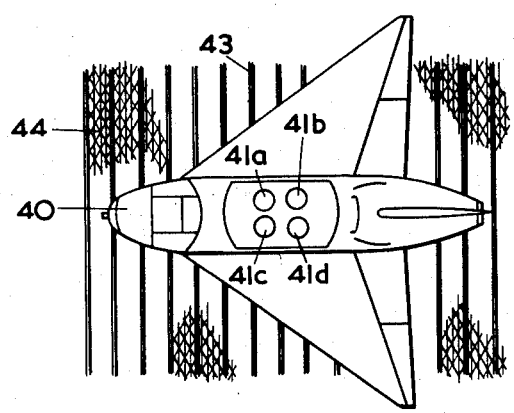

In FIGURES 4 and 5 a "delta" wing aircraft 40 is shown in cross section and has four lifting jet engines 41a, b, c and d approximately centrally located and a forward propulsion jet engine 42. The aircraft is shown at rest on a system of parallel channels 43 covered with an open-mesh grid 44, the channels running transversely of the aircraft's fore and aft axis.

Figure 6:
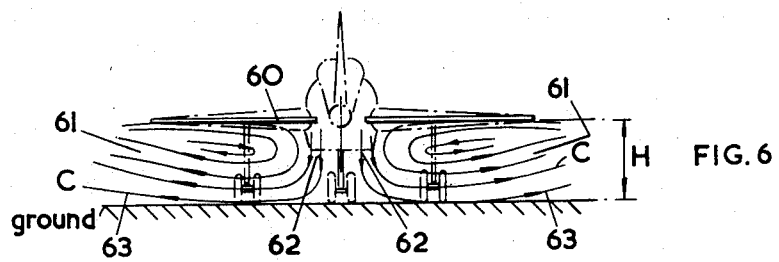
FIGURES 6 and 7 show diagrammatically the air flow induced under the wing of a jet lift aircraft with and without the benefit of the channel system of the invention.

In FIGURE 6 the circulation of the air under the wing of an aircraft 60 standing on a level surface is shown diagrammatically by the arrows C. The circulation consists of air in the region 61 from the regions outboard of the wing which is accelerated and entrained inwards towards the vertical boundary 62 of the jet and is returned outwards along and parallel to the approximately horizontal boundary 63 of the jet which is spreading radially outwards from its point of impact with the ground.

In this case the relationship of the distance H, between the ground and the lower surface of the wing and the equivalent diameter D of the delta wing plan form under consideration is $H/D=0.3$ and the relationship of the suction S due to the ground effect and the jet thrust T is $$\frac{S}{T}=0.16$$

Figure 7:
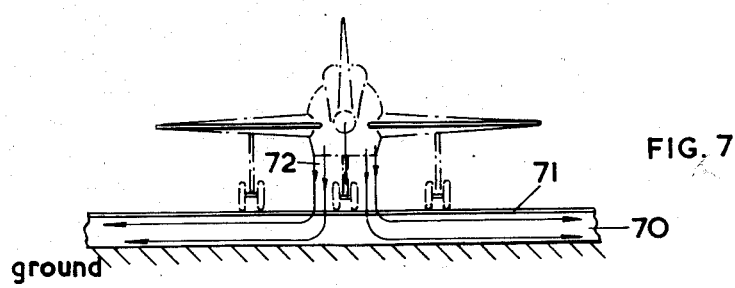

In FIGURE 7 the aircraft of FIGURE 5 is shown standing on a system of parallel contiguous channels 70 covered with a gunmesh grid 71 according to the invention with the jet 72 discharging into the channels, the circulation (arrows C) being thereby modified so as to consist almost entirely of the jet whose horizontal spread over the ground is confined substantially wholly within and parallel to the channels, with negligible entrainment taking place, and the suction effect being reduced to approximately 2% of the lifting jet thrust.

The use of the invention readily makes available for lifting and sustaining the aircraft up to 98% of the gross thrust generated by the lifting engine when the aircraft is on or close to the ground whereas the losses due to suction without its use may amount to 20% of the gross thrust.

We claim:

1. Aircraft ground equipment for use by vertical take-off and landing aircraft in which aircraft vertical thrust is provided by a downwardly directed propulsive jet, said equipment comprising a base, a series of upstanding rigid load supporting walls mounted spaced apart on the base to define conjointly with the base a system of open topped and open ended long channels, the upper edges of at least some of said walls constituting means capable of supporting a grounded aircraft on said equipment, said channels being adapted to receive substantially all of the downwardly directed propulsive jet efflux discharged by said aircraft when it is positioned above said channels and the dimensions of the channels being such that substantially all of the received jet efflux is conducted within the channels outwardly from and clear of the aircraft and that thereby the entrainment of air beneath the aircraft in said jet is maintained at a low level.

2. Airfield ground equipment as claimed in claim 1 having aircraft supporting means comprising an open mesh grid which is supported on the upper regions of the upstanding walls said mesh being perforated to a maximum extent, concomitant with providing the desired supporting function, so as to provide a minimum of resistance to the jet efflux.

3. Airfield ground equipment as claimed in claim 1 in which the upstanding walls are parallel and define, together with the base, a plurality of contiguous parallel sided channels.

4. Airfield ground equipment as claimed in claim 3 in which the ratios of the channel widths and the channel heights to the effective radius of the jet efflux are not greater than 1.5 and at least 1.5, respectively.

5. Airfield ground equipment structure as claimed in claim 3 having aircraft supporting means comprising an open mesh grid which is supported on the upper regions of the upstanding walls.

6. Airfield ground equipment structure as claimed in claim 3 in which alternate walls are of different height, alternate walls being high and low, respectively.

7. Airfield ground equipment structure as claimed in claim 6 in which the higher walls each comprises a vertical plate member and support members which latter support the plate member with its lower edge clear of the base member to define a slot between the plate member and the base.

References Cited in the file of this patent

UNITED STATES PATENTS

| 664,137 | Edwards | Dec. 18, 1900 |
| 1,811,152 | Seversky | June 23, 1931 |

FOREIGN PATENTS

| 988,149 | France | Apr. 25, 1951 |
| 1,049,955 | France | Aug. 26, 1953 |
| 1,186,310 | France | Feb. 23, 1959 |

OTHER REFERENCES

The Evening Star, Washington, D.C., Oct. 22, 1941, photograph: "Walking Air Field."